June 15, 1943.   C. F. HESS   2,322,132
RAKE
Filed April 25, 1942
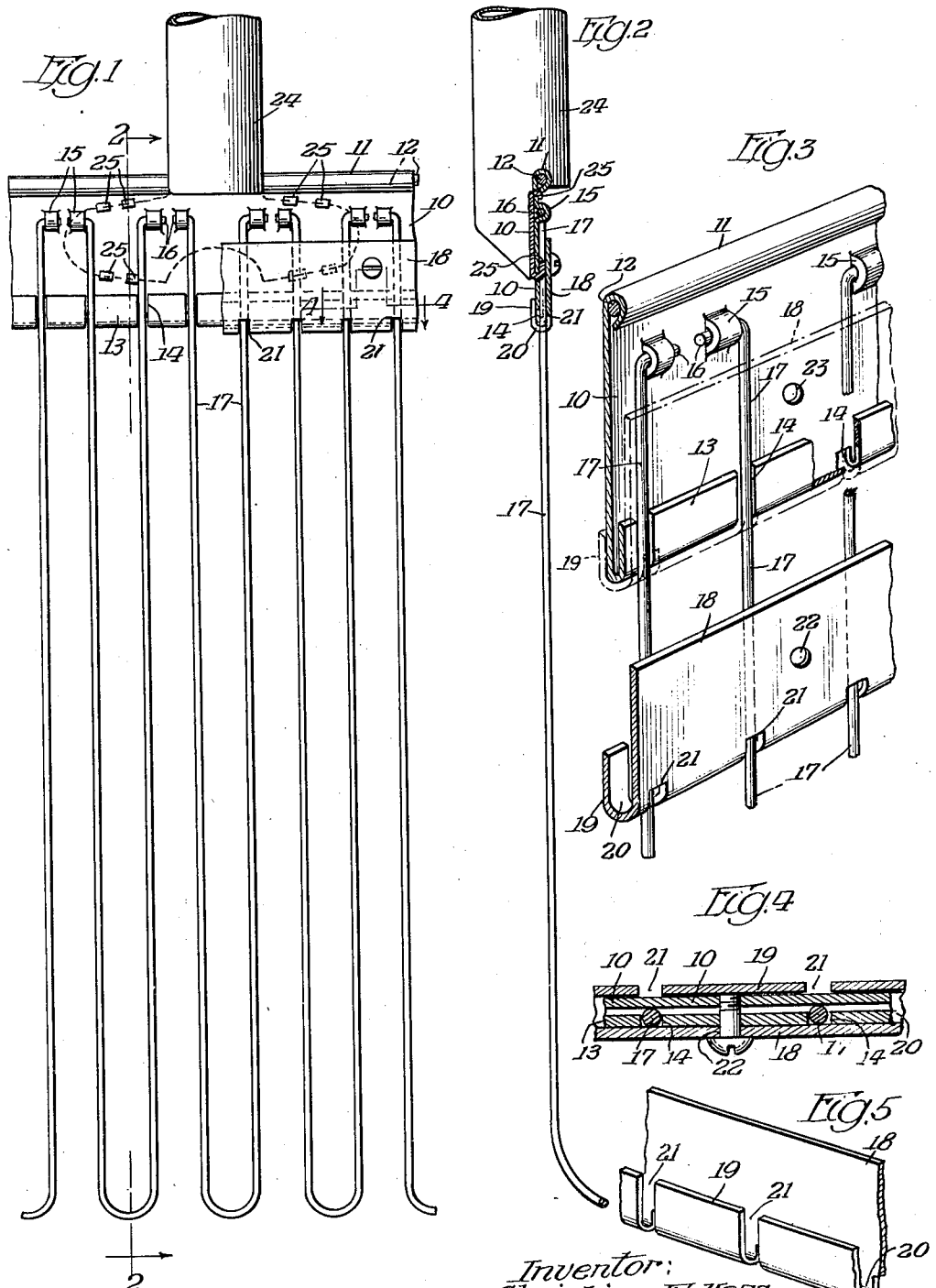
Inventor:
Christian F. Hess

Patented June 15, 1943

2,322,132

UNITED STATES PATENT OFFICE 2,322,132

RAKE

Christian F. Hess, Wilmette, Ill.

Application April 25, 1942, Serial No. 440,477

10 Claims. (Cl. 56—400.17)

This invention relates to improvements in rakes for raking or sweeping leaves, trash, lawns, and for similar purposes, and one of the objects of the invention is to provide an improved light, simple, inexpensive and efficient rake in which any one or more of the teeth may be readily removed and replaced by another tooth without interfering with, or detaching any of the other teeth from the rake head.

A further object is to provide improved means for detachably securing the teeth and for preventing them from becoming accidentally detached from the head, by maintaining the portions of the teeth that are adjacent the head of the rake against lateral movement with respect to the head.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Fig. 1 is a view, partly in elevation, and partly broken away, of a rake of this character constructed in accordance with the principles of this invention.

Fig. 2 is a longitudinal sectional view taken on line 2—2, Fig. 1.

Fig. 3 is a detail perspective view, partly in section, partly broken away, of a portion of a rake head with teeth attached thereto, and with the portions of the rake head separated.

Fig. 4 is a detail sectional view, on an enlarged scale, taken on line 4—4, Fig. 1.

Fig. 5 is a detail perspective view of a fastening plate or member constituting a portion of the head.

The rake consists, essentially, of a head plate or member 10 which may be of any desired size and configuration, and is preferably constructed of sheet material which is comparatively narrow with respect to its length. One edge of this head plate is bent back upon itself, as at 11, preferably over a re-enforcing bar 12, while the opposite edge of the plate is bent back, as at 13, to form a substantially U-shaped portion, the bent-back portion terminating a considerable distance short of the opposite edge of the plate.

In this portion 13, slots 14 are provided which open through the edge thereof and also through the bottom of the turned-back portion.

Other portions of the plate 10 are stamped or cut out to form bearings 15, in which the laterally deflected ends 16 of substantially U-shaped tooth members 17 are adapted to enter so as to form bearings for the teeth, whereby they may be pivotally and detachably connected with respect to the head plate 10.

When the teeth are secured to the head plate, portions of the body thereof are seated in the slots 14, and the diameter of such portions is such that the periphery of the body portions of the teeth will be substantially flush with the front face of the bent-back portion 13, as shown more clearly in Fig. 4.

A fastening plate 18, also constructed of any suitable material, preferably metal, and which is comparatively narrow with respect to its length, has one of its edges 19 bent back upon itself to form a substantially U-shaped portion 20.

Slots 21 pass through the edge of the bent-back portion 19 and also through the bottom of the U-shaped portion 20. This fastening plate 18 is connected to the head plate 10 by telescoping the U-shaped portion of the plate 18 over the bent-back or U-shaped portion 13 of the head plate 10, and the slots 21 in the plate 18 register with the slots 14 in the portion 13 of the head plate, and in which slots 21 portions of the body 17 of the teeth are adapted to stand.

In assembling the rake, the teeth are first connected to the head plate 10 through the medium of the laterally deflected portion 16 entering the bearings 15, and with their body portions standing within the slots 14. The fastening plate 18 is then placed over the teeth below the edge of the head plate 10, and so that the body of the teeth will stand within the slots 21, and with the bent-back portion 19 in a position so as to pass behind the head plate 10 when the two plates are brought together.

The plate 10 is then slide along the teeth until the U-shaped portion 20 of the plate 18 telescopes with the edge of the plate 10 at which the bent-back portion is arranged, as clearly shown in dotted lines in Figs. 2 and 3.

When the plates are thus assembled, they may be secured together in any desired or suitable manner such as by means of fastening devices passing through suitable openings 22 in the plate 18 and corresponding openings 23 in the plate 10.

With this improved construction, and by reason of the fact that the depth of the slots 14 is substantially equal to the diameter of the body of the tooth, the periphery of the tooth will be flush with the outer face of the bent-back portion 13 on the plate 10, so that when the plate 18 is placed in position the inner face of the plate will rest against the outer face of the bent-back portion 13 of the plate 10 and also against the teeth 17. The result will be that the teeth will be firmly held in the slots against lateral movement with respect to the head plate 10, and thereby prevent accidental detachment of the teeth from the head plate.

Furthermore, the plate 18 extends for a substantial distance above the edge of the bent-back portion 13 of the plate 10, and rests flat against the teeth, thereby bracing and protecting the teeth for a substantial distance above the edge of the portion 13.

The teeth may be detached from the head plate 10 by removing the fastening devices for the plates, and then sliding the plate 18 downwardly along the teeth 17 until the plate 18 has disengaged the plate 10. This plate 18 may then be lifted from the teeth 17 as the teeth will pass through the slots or openings 21.

A suitable handle 24 may be fastened to the head plate in any desired or suitable manner such as by means of ears 25 which pass through slots or openings in the head plate 10 and are then flanged down against the face of the plate.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A rake comprising a head plate one edge of which is bent back upon itself to form a substantially U-shaped portion, there being spaced slots opening through the bottom of the bent portion and also through one of the edges of said plate, a tooth formed of a single piece of resilient material of substantially U-shaped configuration, the extremities of the sides of the tooth being deflected laterally, there being openings in said plate to receive said deflected extremities, the sides of the tooth being seated in said openings, and a substantially U-shaped fastening member having slots for the tooth through its bottom, which slots also open through the edge of one of the walls of said member, said fastening member telescoping with the slotted edge of said plate, with the slots in one in register with the slots in the other, said fastening member engaging the teeth above the edge of the turned-back portion of the said plate.

2. A rake comprising a head plate one edge of which is bent back upon itself to form a substantially U-shaped portion, there being spaced slots opening through the bottom of the bent portion and also through one of the edges of said plate, a tooth formed of a single piece of resilient material of substantially U-shaped configuration, the extremities of the sides of the tooth being deflected laterally, there being openings in said plate to receive said deflected extremities, the sides of the tooth being seated in said openings, and a substantially U-shaped fastening member having slots for the tooth through its bottom, which slots also open through the edge of one of the walls of said member, said fastening member telescoping with the slotted edge of said plate, with the slots in one in register with the slots in the other, said fastening member engaging the teeth above the edge of the turned-back portion of the said plate, a portion of each of the said plate and the fastening member forming a closure for the slots in the other.

3. A rake comprising a head plate one edge of which is bent back upon itself to form a substantially U-shaped portion, there being spaced slots opening through the bottom of the bent portion and also through one of the edges of said plate, a tooth formed of a single piece of resilient material of substantially U-shaped configuration, the extremities of the sides of the tooth being deflected laterally, there being openings in said plate to receive said deflected extremities, the sides of the tooth being seated in said openings, and a substantially U-shaped fastening member having slots for the tooth through its bottom, which slots also open through the edge of one of the walls of said member, said fastening member telescoping with the slotted edge of said plate, with the slots in one in register with the slots in the other, said fastening member engaging the teeth above the edge of the turned-back portion of the said plate, a portion of the lateral faces of the teeth intermediate the extremities of the teeth for a substantial distance, being disposed between and resting against lateral faces of said plate and fastening member.

4. A rake comprising a head plate one edge of which is bent back upon itself to form a substantially U-shaped portion, there being spaced slots opening through the bottom of the bent portion and also through one of the edges of said plate, a tooth formed of a single piece of resilient material of substantially U-shaped configuration, the extremities of the sides of the tooth being deflected laterally, there being openings in said plate to receive said deflected extremities, the sides of the tooth being seated in said openings, and a substantially U-shaped fastening member having slots for the tooth through its bottom, which slots also open through the edge of one of the walls of said member, said fastening member telescoping with the slotted edge of said plate, with the slots in one in register with the slots in the other, said fastening member engaging the teeth above the edge of the turned-back portion of the said plate, the portion of the tooth which is disposed within the slots in the plate being of a diameter that the face of the tooth will be substantially flush with the outer face of the bent-back portion of the plate.

5. A rake including a head composed of two substantially U-shaped members, each provided with spaced slots extending through its bottom and also through one edge thereof, teeth detachably connected to one of said members and extending through the respective slots, means detachably anchoring the teeth at one extremity to the last said member, the said members telescoping with each other, with the bottom of the U-shaped portion of one seated in the U-shaped portion of the other, unslotted portions of each member forming closures for the slots in the other member.

6. A rake including a head composed of two substantially U-shaped members, each provided with spaced slots extending through its bottom and also through one edge thereof, teeth detachably connected to one of said members and extending through the respective slots, means detachably anchoring the teeth at one extremity to the last said member, the said members telescoping with each other, with the bottom of the U-shaped portion of one seated in the U-shaped portion of the other, the lateral face of the unslotted portion of each member respectively contacting the lateral faces of the teeth above the slotted wall of the other member.

7. A rake embodying a head consisting of two substantially U-shaped members, the edge of one wall of each member terminating short of the edge of the other wall, there being spaced slots through the bottom of each member that also open through the edge of one of said walls, teeth anchoring means on one of said members spaced from the edge of the respective shorter wall, said members telescoping with each other, with the slots in registering relation and with the slotted wall of each disposed adjacent an unslotted portion of the wall of the other member, and in which registering slots the sides of the teeth are seated and extend therethrough.

8. A rake embodying a head consisting of two substantially U-shaped members, one of the walls of each of which is provided with spaced slots opening through its edge, said slots also extending through the bottom of the members, said members being telescoped with each other, with the slotted wall of one member adjacent an unslotted portion of the wall of the other member and with the slots of said members in registering relation, teeth passing through the registering slots, and means detachably securing one end of each tooth to one of the said members.

9. A rake embodying a head consisting of two substantially U-shaped members, one of the walls of each of which is provided with spaced slots opening through its edge, said slots also extending through the bottom of the members, said members being telescoped with each other, with the slotted wall of one member adjacent an unslotted portion of the wall of the other member and with the slots of said members in registering relation, teeth passing through the registering slots, and means detachably securing one end of each tooth to one of the said members, the slotted wall of each member terminating short of the edge of the other wall of the respective members, the unslotted portion of the other wall of each member extending above the edge of the slotted wall of the other member and contacting the teeth thereabove between the point of anchorage of the teeth and the adjacent edge of the slotted wall of one of said members.

10. A rake embodying a head comprising two members comparatively long with respect to their width, each member being of a substantially U-shaped configuration, the edge of one wall of each member terminating short of the edge of the other wall, the shorter wall of each member being provided with slots extending through the edge thereof and also through the bottom of the U-shaped portion, teeth seated in the slots of one member and anchored by their extremities to the last said member, said members telescoping with each other, with the unslotted longer wall of each member contacting a lateral face of the shorter slotted wall of the other member, and also contacting the teeth for a substantial distance beyond the edge of the shorter wall.

CHRISTIAN F. HESS.